(12) United States Patent
Bösch

(10) Patent No.: US 6,302,300 B1
(45) Date of Patent: Oct. 16, 2001

(54) BAG TUBE AND METHOD FOR PRODUCING A DEFORMABLE RECEPTACLE

(75) Inventor: Karl Bösch, Duggingen (CH)

(73) Assignee: H. Obrist & Co. AG, Reinach (CH)

( * ) Notice: Subject to any disclaimer, the term of this patent is extended or adjusted under 35 U.S.C. 154(b) by 0 days.

(21) Appl. No.: 09/367,815

(22) PCT Filed: Mar. 10, 1998

(86) PCT No.: PCT/CH98/00096

§ 371 Date: Aug. 23, 1999

§ 102(e) Date: Aug. 23, 1999

(87) PCT Pub. No.: WO98/40286

PCT Pub. Date: Sep. 17, 1998

(30) Foreign Application Priority Data

Mar. 12, 1997 (CH) .................................................. 591/97
May 1, 1997 (CH) .................................................. 1021/97

(51) Int. Cl.[7] .................................................. B65D 35/08
(52) U.S. Cl. .............................................. 222/107; 222/92
(58) Field of Search ........................... 222/92, 107, 206, 222/215

(56) References Cited

U.S. PATENT DOCUMENTS 4,090,541 * 5/1978 Cammarata. III et al. .......... 222/107
4,394,936 * 7/1983 Shavit .................................. 222/107

* cited by examiner

Primary Examiner—Kevin Shaver
Assistant Examiner—Thach H Bui
(74) Attorney, Agent, or Firm—Shoemaker and Mattare

(57) ABSTRACT

A plastic reinforcement engaging the end wall of a bag tube includes an outlet surrounded by an outwardly extending flange which has the same curvature as the end wall and extends. This construction stiffens the end wall and reduces the risk of the tube tipping over which it is rested upside down on its cap.

8 Claims, 4 Drawing Sheets

FIG. 11
FIG. 12
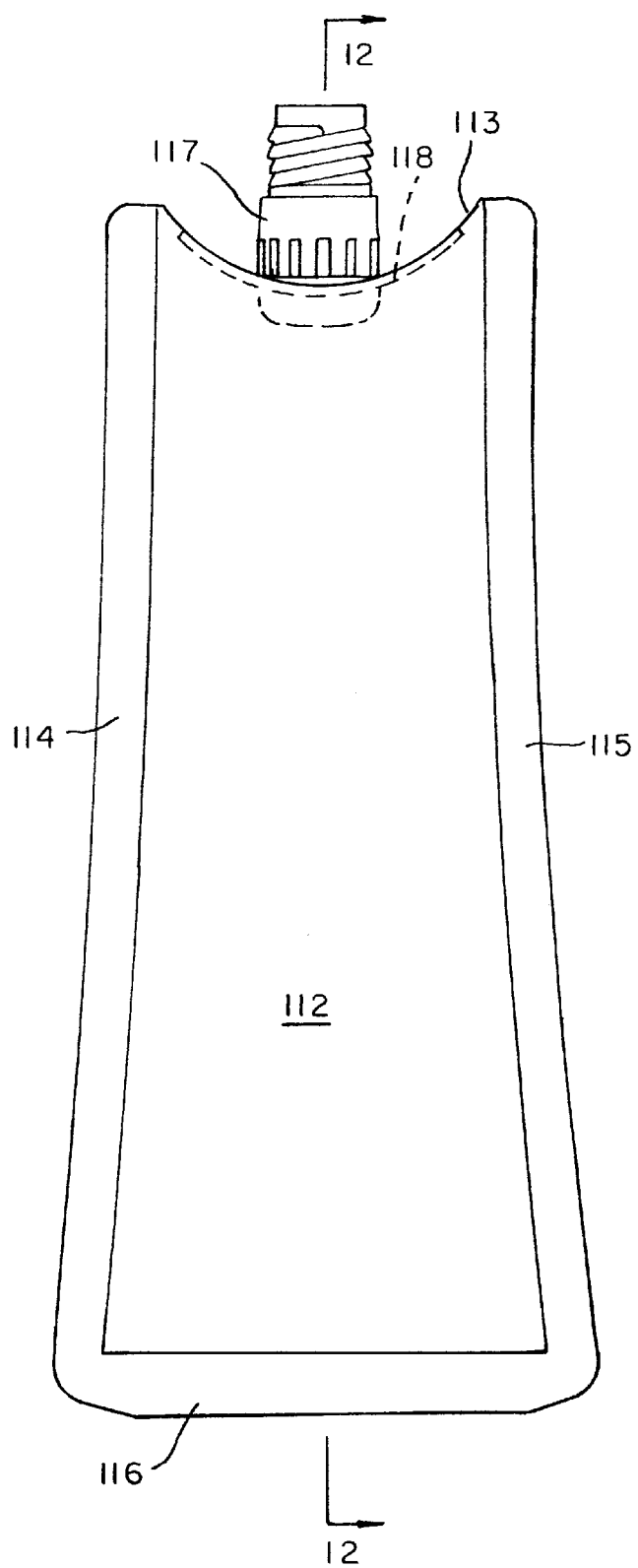
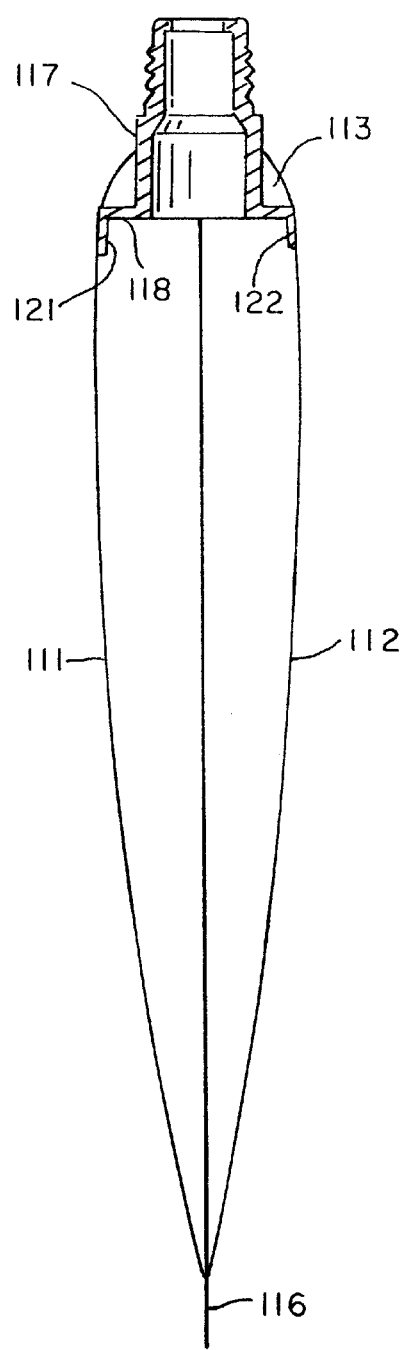

BAG TUBE AND METHOD FOR PRODUCING A DEFORMABLE RECEPTACLE

The invention relates to a bag tube with a foil material which forms an end-face wall and two lateral walls of the tube, wherein the lateral walls are connected to one another along two lateral edge sections, and with a shoulder piece which comprises a closable outlet connection piece and a flange which is fastened to the end-face wall and which is curved like the end-face wall.

BACKGROUND

It is often desirable to place upright such a bag tube with a closure cap closing the opening of the shoulder piece directed downwards. With this there exists the danger that the tube falls over, because the foil material deforms under the weight of the contents of the tube. The danger in particular exists when the foil material—in a likewise desirable manner—is formed thin, light and flexible.

SUMMARY OF THE INVENTION

An object of the invention lies in forming a bag tube of the previously mentioned type such that the previously outlined danger of falling over when the tube as indicated is placed on the head is reduced.

According to the invention the object is achieved in that the flange proceeding from the outlet connection piece outwardly extends along the end-face wall up to a middle region of each lateral wall and extends along the end-face wall in the direction of the two edge sections of the lateral walls.

Preferably there may be provided two tabs which proceed from the flange and bear on the middle region of the lateral walls. These offer additionally a protection of the foil material against twisting or damage when the tube is grasped in the region of the end-face wall for screwing off or screwing on. In order to ensure a residual emptying of the tube these tabs advantageously are to be formed flexibly.

The invention also relates to a method for manufacturing a deformable container which is envisaged for accommodating a pasty product, specifically to a method according to the preamble of patent claim 7.

For packaging pasty products such as mustard, mayonnaise, toothpaste as well as cream-like cosmetic and medical products above all aluminium, laminate and plastic tubes are used.

Known aluminium tubes are generally cylindrical and have at one end-face end a conical end-face with an outlet connection piece which can be closed with a screw top. The method for manufacturing aluminium tubes is work intensive and cost intensive. Thus aluminium tubes are premanufactured with the impact extrusion method from an aluminium circular blank on a first varnishing machine are varnished on the inner side, by way of a pressure machine are pressed to the outside and on a second varnishing machine are varnished over on the outside. By way of a further device then the closure top is screwed onto the premanufactured tubes.

With the manufacture of such known tubes the ends of the tubes, which face the closure top, are left open. On filling the tubes the pasty product is filled in through this open end, whereupon the tube is then completely closed.

Since the tubes and the pasty products to be filled are usually manufactured in different manufacturing plants, the premanufactured empty tubes must be packaged and transported from the tube manufacturer to the product manufacturer, where they are then filled with the corresponding product and closed. At the tube manufacturer as well as also at the product manufacturer storage rooms are therefore required for the intermediate storage of the empty tubes ready for filling. The intermediate storage as well as also the transport from the tube manufacturer to the filling plant of the product manufacturer is considerably disadvantageous for the economics of the tube manufacture. Added to this is the fact that on storage and transporting the empty tubes which are opened at the end-face, contaminations may not be be prevented from getting into the empty tubes, which then in many cases renders necessary the prior provision of additional cleaning and sterilisation procedures in the production operation of the product manufacturer.

In a very similar manner the already known plastic tubes are manufactured. With this tubing blanks are manufactured which in subsequent machines are printed, varnished and subsequently provided with a closure body. These tubes too are open likewise on one side and are intermediately stored at the tube manufacturer as well as also at the product manufacturer.

From the European Patent specification 0'041'924 there is known a flexible container which can be manufactured and filled in a continous method, thus may be completed ready for sale at only one plant. This known tube-like container comprise a tube body which is manufactured from a one-piece foil and which on its folded end-face side is provided with an outlet and has two walls which have an essentially rectangular outline, are welded to one another at three sides and are located on various sides of a plane of symmetry running through the tube longitudinal axis.

With a method which has the the manufacture of the container as well as also the filling procedure as the subject-matter, in particular the filling of the containers determines the cycle for the whole production. The containers must be manufactured as quickly as the product may be filled. Thus the method steps welding, cutting to shape, welding-on of the outlet connection piece and placing on the closure top, must be effected in the same cycle number as the filling of the premanufactured containers. Difficulties in maintaining the method parameters or delays in the cycle frequency then occur when the outlet connection piece for reasons of manufacturing technology may only be welded from one side as roughly is the case with the method known from from EPB 0 041 924. Thus in this method the outlet connection piece from the inner side is placed into an opening of the premanufactured tube body and is welded to the foil from the outer side. This welding procedure with this delays the filling output and has the result that the manufacturing and filling capacity is reduced.

The invention also deals with the further object of providing a new method for manufacturing a deformable container which not only makes possible the manufacture of the container but also the simultaneous filling from continuously prepared containers and which does not have the disadvantages of the previously described manufacturing methods.

Proceeding from the European Patent document 0'041'924 this object is achieved by the features of patent claim 7.

The invention further relates to a new-type, deformable container, manufacturable according to the method of claim 7, specifically a container with the features of claim 14.

Advantageous embodiment forms of the method and of the container are the subject-matter of the dependent claims 8 to 13 or 15 and 16.

The new-type method according to the invention is essentially characterised by the fact that in only one working process from high-quality foil material a container is formed, filled with a pasty product, closed and subsequently packaged.

The method according to the invention has big advantages. It is inexpensive, simple in logistics and product preparation as well able to be used in every filling plant without giving it a second thought. The manufacturing costs are furthermore also relatively small since the containers are formed in simple steps and as such do not need to be premanufactured and intermediately stored. The containers may thus be directly manufactured in the plant of the product manufacturer or at pay fillers.

The containers which may be manufactured by the method according to the invention consists of a flexible one-layered foil material but also of a likewise flexible multi-layered compound material of plastic, aluminium and/or paper. Thus for example it may be the case of a three-layered, foil-like compound material consisting of polyester, aluminium and polypropylene or polyester, aluminium and polyethylene, wherein then the polyester forms the outer layer, the aluminium the middle layer and the polypropylene or the polyethylene the inner layer of the container.

BRIEF DESCRIPTION OF THE DRAWINGS

The subject-matter of the invention is now described in more detail by way of embodiment examples shown in the drawings. In the drawings there are shown.

SUMMARY OF THE PREFERRED EMBODIMENT(S)

Figure 1:
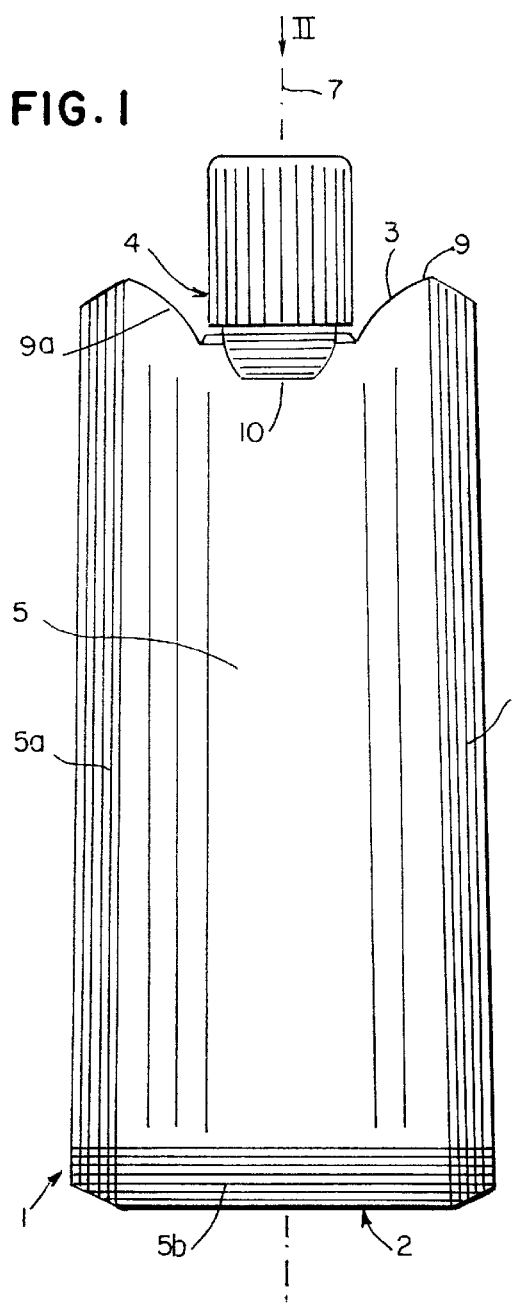
FIG. 1 a plan view of the wide side of a deformable container with an applied closure body, FIG. 2 a plan view of the end on the outlet side of the container in the arrow direction II of FIG. 1, FIG. 3 a plan view of a foil blank consisting of foil parts lying over one another, FIG. 4 an enlarged view of the blank IV of FIG. 3, FIG. 5 a section through the closure top shown in FIG. 1, in an enlarged scale, FIG. 6 a section through the outlet connection piece envisaged for receiving the closure top, FIG. 7 a section through the closure body formed of the closure top and the outlet connection piece, FIG. 8 a section along the line VIII of FIG. 3 with a fastening connection piece which is introduced in the longidinal direction and envisaged for receiving the closure body, FIG. 9 the connection pieces of FIG. 8 in the applied condition, FIG. 10 a section through the closure of the container shown in FIG. 1, which is formed by the closure body and the fastening connection piece, FIG. 11 a lateral view of a bag tube, FIG. 12 a section according to line 12—12 in FIG. 11, FIG. 13 in an enlarged scale a plan view of the bag tube of FIGS. 11 and 12, FIG. 14 a shoulder piece of the bag tube in the section according to line 14—14 in FIG. 13 and FIG. 15 the shoulder piece in a section according to line 15—15 in FIG. 13.
Figure 2:
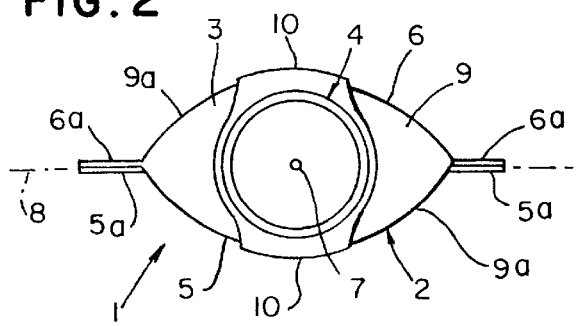

The deformable container which is shown in the FIGS. 1 and 2 and is indicated in its entirety at 1 comprises a tubing body 2 with an end-face side 3 which for its part is provided with an outlet opening—yet to be described in more detail—which can be closed by a closure body 4.

The tubing body 2 for its part has two walls 5 and 6 which have an essentially rectangular outline, are located on various sides of a plane 8 running through the longitudinal axis 7 and with respect to this plane 8 are mirror-symmetrical to one another. The two walls 5 and 6, on sides distant to one another, in each case comprise a strip-shaped edge section 5a and 6a and at their end distant to the outlet in each case a likewise strip-shaped transverse section (of which only the section 5b of the wall 5 is drawn visible). The edge sections of the two walls 5 and 6 bear on one another in pairs and are welded to one another. As will yet be explained in more detail, the two walls 5 and 6 together with a middle section 9 connecting them consist of a one-piece, foil-like compound material consisting of three layers of polyester, aluminium and polypropylene connected to one another.

The end-face side 3 of the tubing body 2, which comprises the outlet opening is formed essentially by the mentioned middle section 9. On this there is arranged an outlet connection piece of plastic which will yet be described in more detail which as part of the closure body 4 amongst other things for the protection of the end-face edges 9a is provided with protective tabs 10 covering the walls 5 and 6 and for reinforcing the end-face side 3 is provided with lateral shoulder supports 11.

Figure 3:
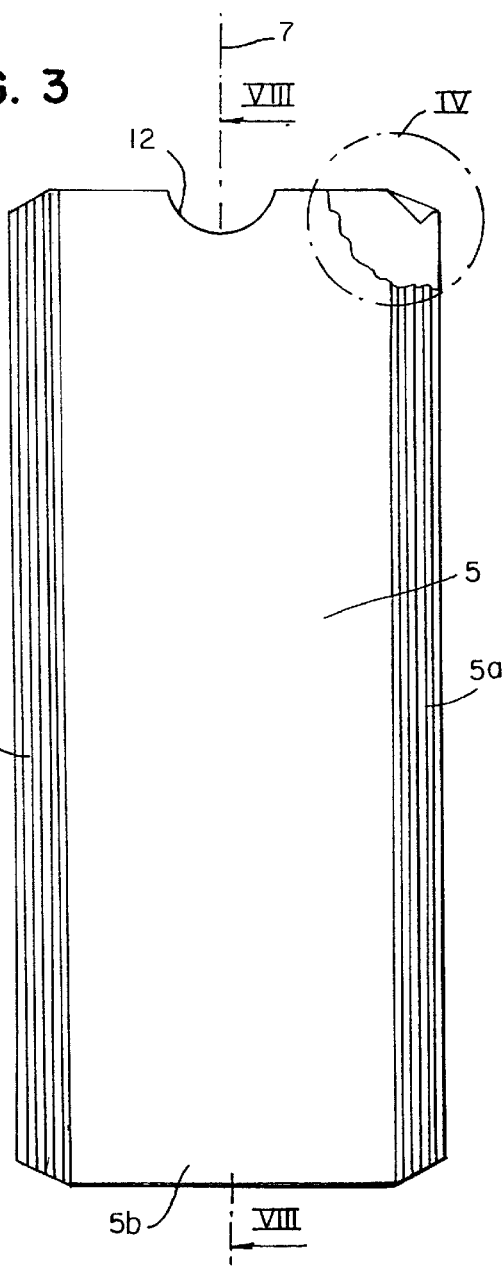

In the outline projected parallel to the axis 7, shown in FIG. 2, the middle section 9 has essentially the shape of a convex lens, wherein the acute angled edges of the lateral edges 5a, 6a running out in the end-face region 3 project in a winged-manner over the outlet opening 12 of the container, which is shown in FIG. 3 and provided in the middle section 9. In the view shown in FIG. 1 thus the middle section is indented and adheres on both sides of the symmetry plane 8 via the end-face edge 9a to in each case one of the two walls 5 and 6. In the regions of the edges 5a and 6a the two end-face edges 9a unite to a single folding edge lying in the plane of symmetry 8.

For manufacturing the container represented in FIGS. 1 and 2 in a first method step a foil or compound material subject, whose width is double the length of the tubing body 2, is drawn over a wedge and is folded along the subject longitudinal axis into two equal halves, from which then the two walls 5 and 6 of the tubing body 2 are formed. The foil or compound material subject may with this for example be wound off from a tape roller, wherein then as will yet be explained only in an already advanced method phase is the premanufactured tubing body separated from the tape material or from the foil or compound material subject.

In a second method step the folded foil or compound material subject, preferably wound off from a tape roller, is divided into foil sections envisaged for the manufacture of individual containers. For this the subject tape by way of a transport device is transported further in steps by in each case one width of the tubing body 2 to be formed, the longidutinal edge of the double-layered subject, which is formed by the fold, is begun to be cut in constant distances transversely to the transport direction and between in each case two such incisions in each case an outlet opening 12 is punched out. Subsequently the end-face corners of the containers to be manufactured, which are formed by the incisions, are folded over inwardly, the two halves of the foil section prepared by the cutting beginning, which bear on one another, are welded transversely to the longitudinal direction and the thus formed tubing body 2 is separated from the remaining part of the tape by way of a cutting tool so that a foil blank of the shape represented in FIG. 3 arises.

Figure 4:
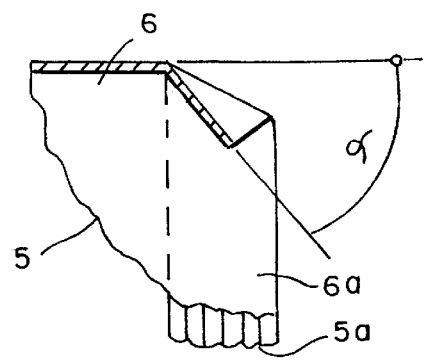

The folding of the two end-face corners about the angle α (FIG. 4) which is 5° to 90°, for example 45° not only results in a strengthening of the edges of the container in this region. By way of the formation of the folds furthermore sharp-edged corners are avoided, which may injure the user given a negligent handling or may damage the carrier bags serving to accommodate the container 1.

Figure 5:
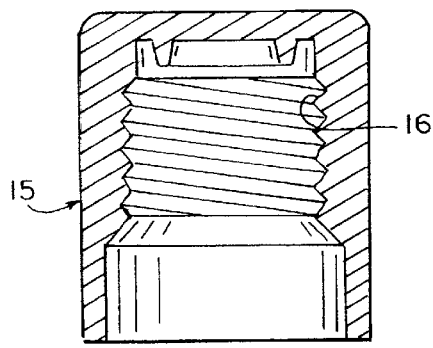
Figure 7:
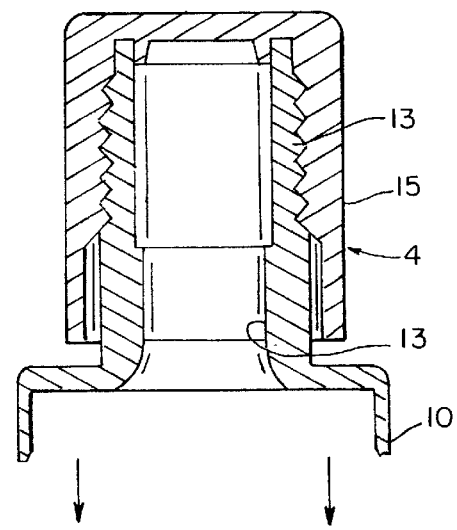
Figure 6:
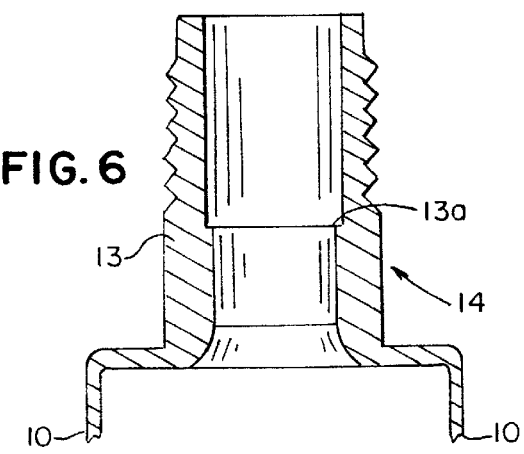

In a further method step, which for example runs parallel to the previously described second method step, the closure body 4 shown in FIG. 7 is prepared. This in the case present here consists of the already above mentioned outlet connection piece 14 (FIG. 6) and of a closure top (FIG. 5), wherein the latter with its inner thread 16 is screwed onto the threaded part 13 of the outlet connection piece 14. As one may particularly see from FIG. 6 the outlet connection piece 14 is still provided with the already previously mentioned protective tabs 10 and shoulder supports 11 and is dimensioned and closable with the closure top having a plane end-face surface such that the container to be manufactured has a sufficiently high standing stability and may be placed upright as a standing container.

Figure 9:
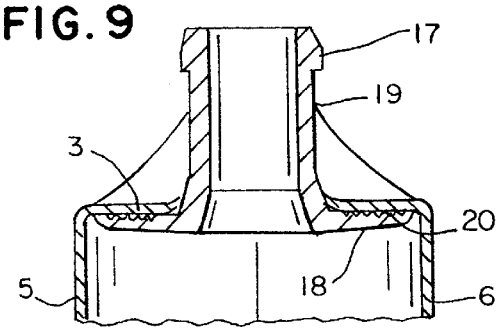
Figure 8:
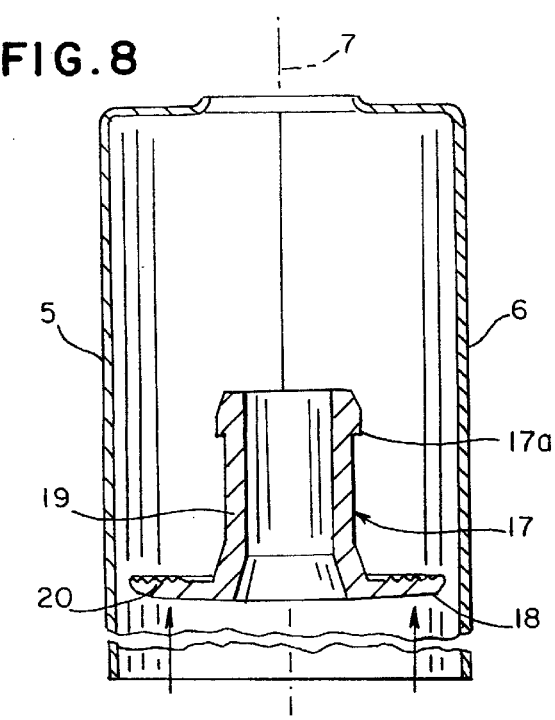
Figure 10:
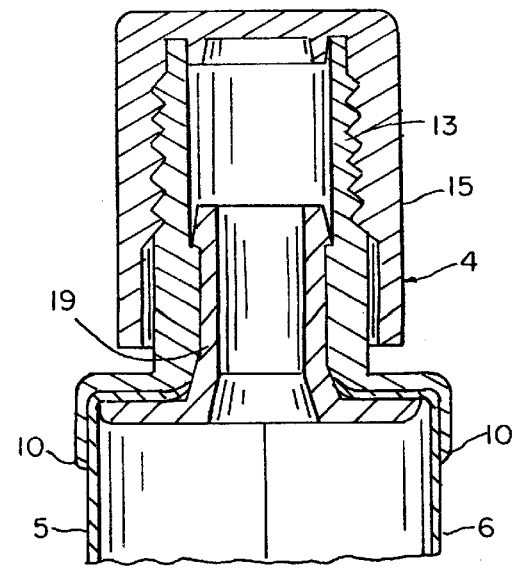

Subsequent to the above method steps a fastening connection piece 17 in the direction of the arrow is led through the blank of the tubing body 2, which is shown in FIG. 8 and is already opened out and is welded, adhesive and/or pressed on the end-face side end of the tubing body, thus on the middle section 9, for which the fastening connection piece 17 in particular is provided with an annular collar 18 which with the middle section 9 assumes the desired connection. As one can recognise from FIG. 9 the neck 19 of the fastening connection piece 17, which is envisaged for receiving the closure body 4, in the fastened condition, penetrates the outlet opening 12 of the tubing body blank and projects out of this. For the optimal connection of the fastening connection piece 17 and middle section 9 the collar 18 may yet additionally be provided with annularly arranged ribs 20 tapering to a point.

After pressing the closure body 4 on the fastening connection piece 17 by way of which in particular the foil piece forming the middle section 9 is tensioned in between the fastening connection piece 17 and the outlet connection piece 14, the pasty product is filled into the tubing body 2 through the opening of the mentioned blank, which lies opposite the end-face side 3 and which in the course of production preferably faces upwards. Subsequently the still remaining opening of the tubing body 2 is closed and welded, and the thus manufactured and filled container is directly led further to a package belt envisaged for the end packaging.

For removing the product from the container 1 according to the invention the closure top 15 is removed and then the tubing body 2 is pressed together beginning from the wide-side end. The material forming the tubing body 2 is preferably deformable in an elastic and in particular plastic manner such that this after pressing out a part of the product it essentially retains its pressed-together shape by way of the so-called "restoring effect" and does not aspirate any air through the outlet connection piece 14.

Concluding it is yet to be noted that the containers which can be manufactured by the above mentioned method may be formed in different ways and therefore may differ from the drawn embodiment example. Thus the container instead of a rectangular outline shape may also have a different outline shape. Also the dimensions and proportions of the containers may vary within large limits. Finally yet also the closure top may be formed in different ways and for example have the shape of a ball or of a polyhedron.

Figure 13:
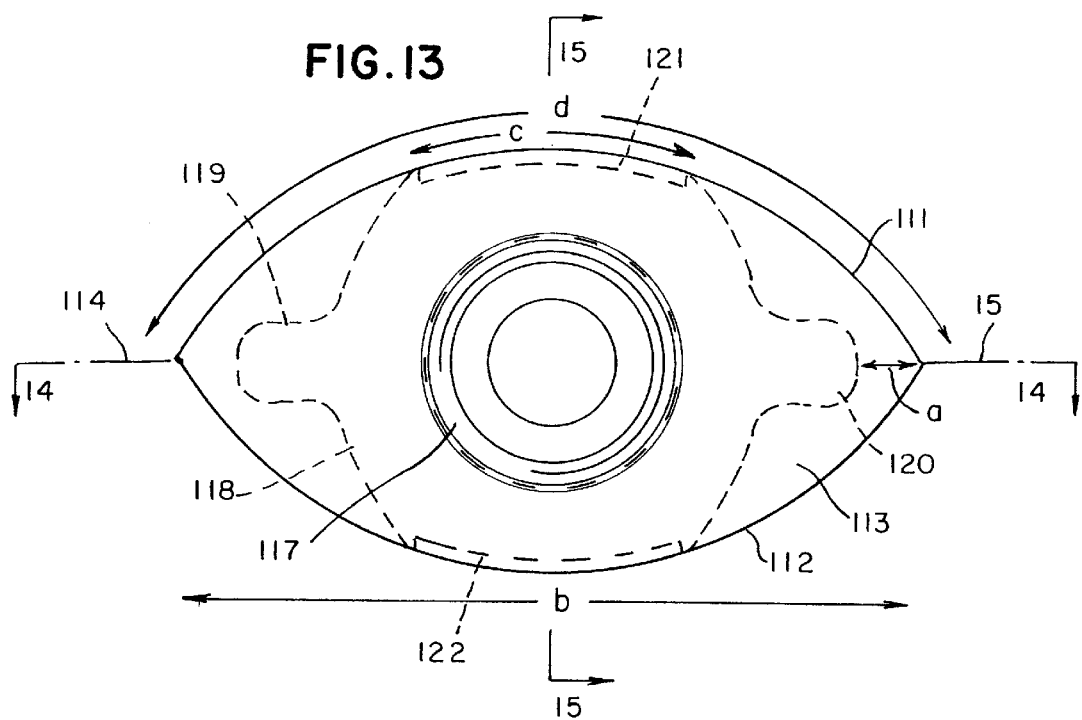
Figure 14:
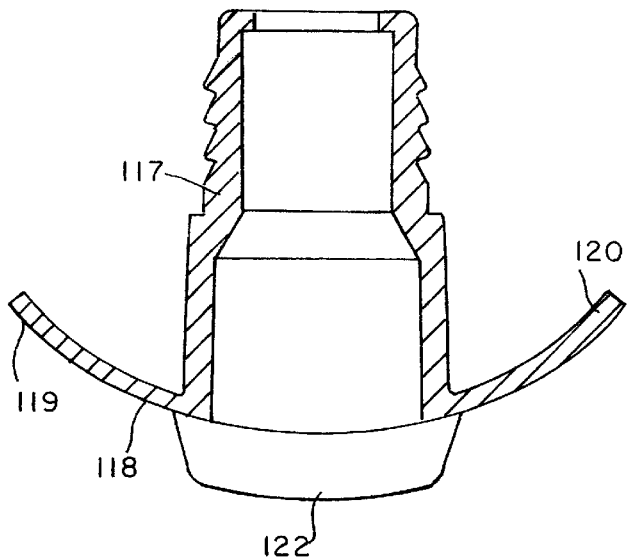
Figure 15:
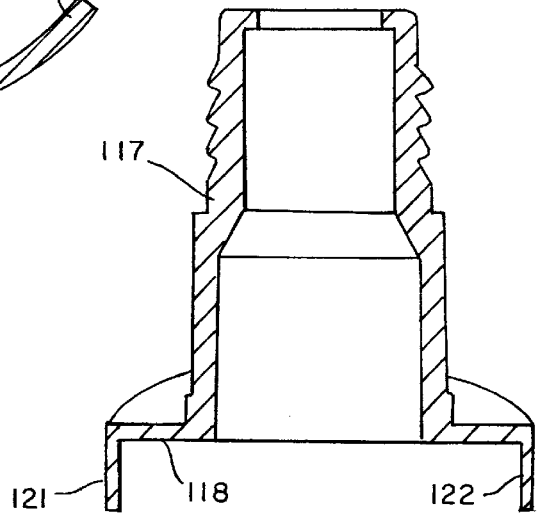

The bag tube shown in the FIGS. 11 to 13 has two lateral walls 111 and 112 and an end-face wall 113 which are all formed by one piece of foil material. The foil material is preferably thin, light and flexible. It may be a simple plastic foil or also a laminate. At least the side of the foil material, which faces the inside of the tube, may consist of weldable plastic. The two lateral walls 111 and 112 are sealingly connected to one another, in particular welded, along two lateral edge sections 114 and 115 and along an end edge section 116.

On the end-face wall 113 there is fastened a shoulder piece which has a closable opening in the form of an outlet connection piece 117. The shoulder piece consists preferably of a weldable plastic. From the outlet connection piece 117 there proceeds a flange 118 which is curved just as the end-face wall 113. The flange 118 bears on the inside on the end-face wall 113 and is sealingly fastened thereto, preferably rigidly welded.

The flange 118 extends, proceeding from the outlet connection piece 117, up to in each case a middle region of each lateral wall 111, 112, to the outside. This middle region of each lateral wall has, as shown in FIG. 13, a width c which is at least equal to 20%, preferably at least 30% of the whole width d of each lateral wall 111, 112 between the lateral edge sections 114 and 115. The flange 118 which extends outwards along the end-face wall 113 up to the upper ends of the lateral walls 111 and 112 serves the stiffening of the end-face wall 113 and by way of this the reduction of the danger that the tube may fall over when it is placed directed downwards with a closure cap (not shown) screwed onto the outlet connection piece 117.

For the same purpose the flange 118 comprises two supports 119, 120 which are fastened to the end-face wall which extend in the direction towards the two lateral edge sections 114 and 115 of the lateral walls 111, 112. The two supports 119 and 120 extend preferably until a distance a (FIG. 13) towards the lateral edge sections 114 or 115, which at the most is equal to 20%, preferably at the most 10% of the distance b between the lateral edge sections measured at the end-face wall 113.

The flange 118 may however also at the edges of the end-face wall 113 comprise two tabs 121 and 122 which are bent at right angles and run parallel to the lateral walls 111 and 112. The tabs 121 and 122 stiffen the middle regions of the lateral walls 111 and 112, which neighbour the end-face wall. At the same time they protect the foil material against twisting and/or damage when the tube for screwing a closure cap (not shown) off of the outlet connection piece 117 is held by a hand in the mentioned regions of the lateral walls. On the other hand the tabs 121 and 122 in order not to hinder the complete pressing out of the tube, are preferably more flexible than the remaining parts of the flange 118. For example the tabs 121, 122 have a smaller wall thickness than the remaining parts of the flange 118.

What is claimed is:

1. In a bag tube comprising
   a foil material which forms an end-face wall and two lateral walls the tube, wherein the lateral walls are connected to one another along two lateral edge sections and
   a shoulder piece comprising a closable outlet connection piece and a flange which is fastened on the end-face wall and is curved corresponding to the form of the end-face wall, the improvement comprising a flange extending from the outlet connection piece outwardly along the end-face wall to a middle region of each said lateral wall.

2. A bag tube according to claim 1, wherein said middle region of each lateral wall has a width which is at least equal to 20% of the whole width of the lateral wall between the lateral edge sections.

3. A bag tube according to claim 1 or 2, wherein the flange comprises at least two protruding tabs bearing on the foil material, for reinforcing the foil material.

4. A bag tube according to claim 1, wherein the flange extends to the lateral edge sections up to a distance from these sections, which at the most is equal to 20% of the distance between the lateral edge sections measured at the end-face wall.

5. A bag tube according to claim 3, wherein the flange comprises two tabs bearing on the middle regions of the lateral walls.

6. A bag tube according to claim 5, wherein the tabs bearing on the lateral walls are more flexible than the remaining parts of the flange.

7. A bag tube according to claim 1, wherein the flange extends to the lateral edge sections up to a distance from these sections, which at the most is equal to 10% of the distance between the lateral edge sections measured at the end-face wall.

8. A bag tube according to claim 1, wherein said flange extends along the end-face wall toward the lateral edge sections of the lateral walls.

* * * * *